UNITED STATES PATENT OFFICE.

CLARENCE T. MARSH, OF CINCINNATI, OHIO, ASSIGNOR OF ONE-HALF TO LOUIS H. WEISSLEDER, OF CINCINNATI, OHIO.

PROCESS FOR ASCERTAINING THE ORIGIN OF COLORING-MATTERS PRESENT IN DISTILLED LIQUORS.

No. 813,728.     Specification of Letters Patent.     Patented Feb. 27, 1906.

Application filed March 30, 1905. Serial No. 252,893.

*To all whom it may concern:*

Be it known that I, CLARENCE T. MARSH, a citizen of the United States, residing at Cincinnati, in the county of Hamilton and State of Ohio, have invented a certain new and useful Process for Ascertaining the Origin of Coloring-Matters Present in Distilled Liqors, of which the following is a specification.

It is the object of my invention to provide a new and useful process for ascertaining the origin of the coloring-matters present in distilled spirituous liquors—for instance, whisky or the like.

My invention consists in mixing amyl alcohol, water, and the distilled alcoholic liquor which is under examination to ascertain the origin of the coloring-matter present, and my invention will be further readily understood from the following description and claims.

In carrying out my invention I take commercial fusel-oil and add a caustic thereto, such as caustic soda or caustic potash, preferably in the proportion of ten per cent. of caustic—for instance, caustic soda or caustic potash— to the commercial fusel-oil and distil the mixture so formed, thereby producing an amyl alcohol from which the coloring-matters present in the commercial fusel-oil have been eliminated—in other words, producing a cleared amyl alcohol. This cleared amyl alcohol is mixed with water, preferably with seven per cent. of its weight of distilled water, and is employed in ascertaining the origin of the coloring-matters present in the distilled alcoholic liquors or in removing coloring-matter from such distilled alcoholic liquors.

In carrying out my process I mix the distilled liquor to be tested or from which coloring-matter is to be removed with the above-mentioned dilute cleared amyl alcohol, preferably in equal proportions of the distilled liquor and the dilute cleared amyl alcohol, mixing the same in a suitable container, preferably by slight agitation, and then permit the mixture to rest, whereupon water present in the mixture will go to the bottom of the container, carrying with it coloring-matter possessed by the distilled liquor other than that which was acquired by the distilled liquor naturally in the process of aging. Illustrating my improved process further, to one dram of the distilled liquor—for example, whisky—held in an ordinary test-tube is added an equal amount of the dilute cleared amyl alcohol and the contents of the tube slightly shaken. After standing a few minutes a lower aqueous layer will have formed by reason of practically all the water present in the distilled liquor and in the dilute cleared amyl alcohol going to the bottom of the test-tube. If this lower aqueous layer is water-white, it indicates that the coloring-matter possessed by the distilled liquor has been acquired by the distilled liquor in and by the natural process of aging; but if this lower layer is colored it shows conclusively that the distilled liquor under examination was artificially colored—that is, had foreign coloring-matter added to it other than that which it acquired during and by the natural process of aging—and by my process this coloring-matter is thrown to the bottom, whereupon the alcoholic mixture above the same may be decanted or siphoned from the coloring-matter.

Explaining the action of my new and useful process, it may be stated that the amyl alcohol of the dilute amyl alcohol forms a mechanical mixture with the ethyl alcohol of the distilled liquor, and on account of its lighter specific gravity and immiscibility with the water it arranges itself as the upper layer. The artificial coloring-matters added to distilled liquors mentioned are more soluble in water than in amyl alcohol and the ethyl alcohol of the distilled liquor, and consequently are carried to the bottom by the heavier aqueous layer. The coloring-matters naturally present in a distilled liquor subjected to this process are more soluble in the amyl and ethyl alcohols, and therefore remain in the upper layer. If the distilled liquor is free from artificially-added coloring-matters, the aqueous layer will show water-white. If the distilled liquor thus treated is merely ethyl alcohol or a mixture of ethyl alcohol and water simply colored, then upon proper treatment the coloring-matter present in the sample of distilled liquor will be found in the lower aqueous layer, thus rendering the upper alcoholic layer colorless. If the color possessed by the distilled liquor thus treated is partly of natural origin and partly of foreign origin, then both the upper alcoholic and the lower aqueous layer will be found colored.

My new and useful process is highly useful in testing distilled spirituous liquors for coloring-matters present therein and for separating the artificial coloring in distilled spirituous liquors—for instance, for use of the latter in the arts.

Having thus fully described my invention, what I claim as new, and desire to secure by Letters Patent, is—

1. The process of testing whisky to ascertain the origin of coloring-matter present in it which consists in distilling fusel-oil with a caustic for depriving the fusel-oil of coloring-matter and thereby forming a cleared amyl alcohol, adding water to said cleared amyl alcohol, mixing the same with the whisky to be tested, whereby the alcohols of said amyl alcohol and of said whisky are associated, then permitting the mixture to rest, whereby water is separated and thrown down under said alcohols by virtue of the higher specific gravity of said water as compared with said alcohols the said water carrying with it and being colored by artificial coloring-matter previously present in said whisky or remaining clear in the absence of artificial coloring-matter in the said whisky being tested, substantially as described.

2. The process of testing distilled alcoholic liquor to ascertain the origin of coloring possessed by it, which consists in adding amyl alcohol and water to the distilled liquor, whereby water is separated from the alcohols of said mixture.

3. The process of testing distilled alcoholic liquor to ascertain the origin of coloring-matter possessed by it, which consists in distilling fusel-oil with a caustic for depriving the fusel-oil of coloring-matter and thereby forming a cleared amyl alcohol, adding water to said cleared amyl alcohol and mixing the same with the distilled alcoholic liquor to be tested whereby the amyl alcohol and the ethyl alcohol of said mixture are combined or associated, then permitting the mixture to rest, whereby water is separated and thrown down by virtue of its higher specific gravity as compared with the said alcohols present, with which it is immiscible.

4. The process of testing distilled alcoholic liquor to ascertain the origin of coloring-matter possessed by it which consists in distilling fusel-oil with caustic soda or caustic potash, mixing said distillate with distilled water, and mixing the composition so formed with the distilled alcoholic liquor to be tested whereby intimate union is formed between the alcohol of said distilled fusel-oil and the alcohol of said distilled alcoholic liquor, then permitting the mixture to rest for permitting said water to separate and be thrown under said alcohols, whereby coloring-matter not acquired by the distilled alcoholic liquor during and by the process of aging is separated from said alcohols and thrown down with the water which holds it in solution, all in the manner and in substantially the proportions stated, substantially as described.

5. The process of testing distilled alcoholic liquor to ascertain the origin of coloring possessed by it which consists in adding amyl alcohol and water to the distilled liquor in substantially the proportions stated and agitating said mixture and then permitting the same to rest, whereby the alcohols of said amyl alcohol and said distilled alcoholic liquor are combined and water is separated from said alcohols, the said water being thrown down and carrying with it artificial coloring-matter previously present in said distilled alcoholic liquor, substantially as described.

In witness whereof I have subscribed my name hereto in the presence of two subscribing witnesses.

CLARENCE T. MARSH.

Witnesses:
A. F. HERBSLEB,
JOHN B. HELWIG.